United States Patent
Trinh

(10) Patent No.: US 9,447,619 B2
(45) Date of Patent: Sep. 20, 2016

(54) 90 DEGREE MAGNETIC LATCH TO PREVENT HIGH SURFACE FLUX

(75) Inventor: Bryan D. Trinh, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 220 days.

(21) Appl. No.: 13/585,567

(22) Filed: Aug. 14, 2012

(65) Prior Publication Data
US 2014/0047677 A1    Feb. 20, 2014

(51) Int. Cl.
| | |
|---|---|
| *E05C 17/56* | (2006.01) |
| *E05C 19/16* | (2006.01) |
| *G06F 1/16* | (2006.01) |
| *E05B 65/00* | (2006.01) |
| *H05K 5/00* | (2006.01) |
| *H05K 7/20* | (2006.01) |

(52) U.S. Cl.
CPC .......... *E05C 19/16* (2013.01); *E05B 65/0067* (2013.01); *G06F 1/1679* (2013.01); *Y10T 24/32* (2015.01); *Y10T 29/49826* (2015.01)

(58) Field of Classification Search
CPC ...... E05C 19/16; E05C 19/166; E05C 17/56; E05C 19/163; Y10T 292/11
USPC ............... 292/251.5; 455/575.3; 361/679.57, 361/679.58, 679.01; 70/276
See application file for complete search history.

(56) References Cited

U.S. PATENT DOCUMENTS

| | | | | |
|---|---|---|---|---|
| 2,496,691 A | * | 2/1950 | Berry ....................... | E05C 17/56 16/404 |
| 3,111,834 A | * | 11/1963 | Felson ................ | E05B 47/0044 70/276 |
| 3,416,336 A | * | 12/1968 | Felson ................ | E05B 47/0044 70/276 |
| 3,578,370 A | * | 5/1971 | Greytok ................... | E05C 17/56 16/86 A |
| 3,782,147 A | * | 1/1974 | Hallmann ........... | E05B 47/0042 70/276 |
| 3,819,199 A | * | 6/1974 | Smolka ................ | A63C 9/0885 280/612 |
| 3,934,909 A | * | 1/1976 | Van Natter ........... | E05C 19/165 292/251.5 |
| 4,364,019 A | * | 12/1982 | Hutter ................ | H01H 36/0073 200/404 |
| 4,380,162 A | * | 4/1983 | Woolfson ............ | E05B 47/0044 70/276 |

(Continued)

OTHER PUBLICATIONS

PCT International Searching Authority, "Notification of the Transmittal of the International Search Report and the Written Opinion of the International Searching Authority, or the Declaration," International patent application No. PCT/US2013/054790, mailed Oct. 21, 2013, 10 pages.

*Primary Examiner* — Carlos Lugo
*Assistant Examiner* — Faria Ahmad
(74) *Attorney, Agent, or Firm* — Lowenstein Sandler LLP

(57) ABSTRACT

An electronic device includes a housing having an external surface and a magnet within the housing that moves from a first position where the magnetic axis is substantially parallel to the external surface to a second position where the magnetic axis is substantially perpendicular to the external surface. The magnet may be configured to move in the presence of an external magnetic field of another magnet, thereby engaging the two magnets.

13 Claims, 9 Drawing Sheets

(56) References Cited

U.S. PATENT DOCUMENTS

| | | | | |
|---|---|---|---|---|
| 4,686,841 A * | 8/1987 | Prunbauer | E05B 47/0042 | 70/276 |
| 4,774,503 A * | 9/1988 | Bussard | | 340/572.9 |
| 4,815,304 A * | 3/1989 | Kesselman | E05B 15/16 | 70/276 |
| 4,919,464 A * | 4/1990 | Richards | | 292/251.5 |
| 5,188,405 A * | 2/1993 | Maccaferri | E05B 47/004 | 292/204 |
| 5,485,733 A * | 1/1996 | Hoffman | E05B 47/004 | 292/251.5 |
| 5,706,332 A * | 1/1998 | Nagai | H01Q 1/084 | 379/433.06 |
| 5,996,831 A * | 12/1999 | Teok | E05B 47/004 | 220/230 |
| 6,366,440 B1 * | 4/2002 | Kung | E05C 19/16 | 361/147 |
| 6,408,484 B1 * | 6/2002 | Vandertouw | E05D 11/1028 | 16/320 |
| 6,474,120 B1 * | 11/2002 | Wadsworth | E05B 63/185 | 292/251.5 |
| 6,588,811 B1 * | 7/2003 | Ferguson | E05B 1/0007 | 16/320 |
| 6,653,919 B2 * | 11/2003 | Shih-Chung | G06F 1/162 | 24/303 |
| 6,922,333 B2 * | 7/2005 | Weng | G06F 1/1616 | 220/230 |
| 6,929,291 B2 * | 8/2005 | Chen | E05C 19/16 | 292/251.5 |
| 7,267,378 B2 * | 9/2007 | Drumm | E05C 19/163 | 292/251.5 |
| 7,543,862 B2 * | 6/2009 | Lin | E05C 19/06 | 292/137 |
| 7,746,205 B2 * | 6/2010 | Fullerton | H01F 7/0284 | 310/90.5 |
| 7,775,567 B2 * | 8/2010 | Ligtenberg | E05C 19/16 | 292/251.5 |
| 7,852,621 B2 * | 12/2010 | Lin | G06F 1/1616 | 24/303 |
| 8,089,748 B2 * | 1/2012 | Chiang | G06F 1/1616 | 361/679.01 |
| 8,166,836 B2 * | 5/2012 | Rudduck | B25B 13/12 | 403/324 |
| 8,260,381 B2 * | 9/2012 | Lee | H04M 1/0245 | 455/556.1 |
| 8,310,819 B2 * | 11/2012 | Shen | G06F 1/1616 | 361/679.01 |
| 8,368,494 B2 * | 2/2013 | Fiedler | | 269/8 |
| 8,382,169 B2 * | 2/2013 | Bosshard | E05C 17/56 | 292/251.5 |
| 8,397,546 B2 * | 3/2013 | Varney | E05B 47/004 | 292/194 |
| 8,403,382 B2 * | 3/2013 | Della-Santa | E05C 17/02 | 16/82 |
| 8,540,292 B2 * | 9/2013 | Ferguson | E05C 17/56 | 24/303 |
| 8,705,229 B2 * | 4/2014 | Ashcraft | G06F 1/1679 | 312/223.1 |
| 8,760,251 B2 * | 6/2014 | Roberts | H01F 7/0284 | 335/207 |
| 8,801,054 B2 * | 8/2014 | Ligtenberg et al. | | 292/251.5 |
| 8,899,636 B2 * | 12/2014 | Fitzgerald | E05C 19/16 | 292/251.5 |
| 8,964,379 B2 * | 2/2015 | Rihn | G06F 1/1616 | 335/288 |
| 9,051,764 B1 * | 6/2015 | Rafter | E05C 17/56 | |
| 2002/0022496 A1 * | 2/2002 | Park | H04M 1/0214 | 455/575.3 |
| 2002/0061733 A1 * | 5/2002 | Wang | H04M 1/10 | 455/575.3 |
| 2005/0018393 A1 * | 1/2005 | Kuo | G06F 1/1616 | 361/679.58 |
| 2006/0006674 A1 * | 1/2006 | Kang | E05C 19/16 | 292/251.5 |
| 2007/0067954 A1 * | 3/2007 | Finney | H04M 1/0247 | 16/235 |
| 2007/0072656 A1 | 3/2007 | Lo et al. | | |
| 2007/0133156 A1 * | 6/2007 | Ligtenberg | G06F 1/1616 | 361/679.27 |
| 2007/0138806 A1 * | 6/2007 | Ligtenberg | E05C 19/16 | 292/251.5 |
| 2008/0048654 A1 * | 2/2008 | Takahashi | G01D 5/145 | 324/207.25 |
| 2008/0061565 A1 * | 3/2008 | Lee | E05C 19/16 | 292/251.5 |
| 2008/0136197 A1 * | 6/2008 | Lin | E05C 19/06 | 292/251.5 |
| 2008/0174127 A1 * | 7/2008 | Kim | E05C 19/166 | 292/251.5 |
| 2009/0103261 A1 * | 4/2009 | Shih | E05C 19/16 | 361/679.58 |
| 2009/0273194 A1 * | 11/2009 | Patterson | E05C 19/16 | 292/251.5 |
| 2010/0222111 A1 * | 9/2010 | Suetake | H01Q 1/242 | 455/566 |
| 2010/0238620 A1 * | 9/2010 | Fish | G06F 1/1616 | 361/679.09 |
| 2011/0001025 A1 * | 1/2011 | Fiedler | A45C 13/1069 | 248/206.5 |
| 2011/0018659 A1 * | 1/2011 | Fullerton | H01F 7/0242 | 335/295 |
| 2011/0026203 A1 * | 2/2011 | Ligtenberg | E05C 19/16 | 361/679.01 |
| 2011/0049911 A1 * | 3/2011 | Bosshard | E05C 17/56 | 292/251.5 |
| 2011/0101711 A1 * | 5/2011 | Della-Santa | E05C 17/02 | 292/251.5 |
| 2011/0298226 A1 * | 12/2011 | Roti | E05C 17/56 | 292/251.5 |
| 2012/0131967 A1 * | 5/2012 | Sanchez Giraldez | | 70/276 |
| 2013/0329360 A1 * | 12/2013 | Aldana | G06F 1/1626 | 361/679.56 |
| 2014/0306463 A1 * | 10/2014 | Ho | E05C 19/16 | 292/251.5 |

* cited by examiner

90 DEGREE MAGNETIC LATCH TO PREVENT HIGH SURFACE FLUX

BACKGROUND

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. A cover may be provided for such devices to protect components of the device.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

Magnets provided a wonderful user experience, but present specific engineering challenges. For example, in some orientations, when magnets in a device are brought close to ferromagnetic materials, the device will be attracted to the materials. Thus, in one embodiment, a magnet embedded in a device is positioned such that the magnetic flux is directed away from exterior of the device, but is rotated when a strong enough magnetic field is brought close to the device.

In one embodiment, a magnetic latch includes a first latch component with a first magnet and a second latch component with a second magnet. When the two magnets are brought close together, the second magnet rotates to form a completed magnetic circuit through the first and second magnets.

Figure 1:
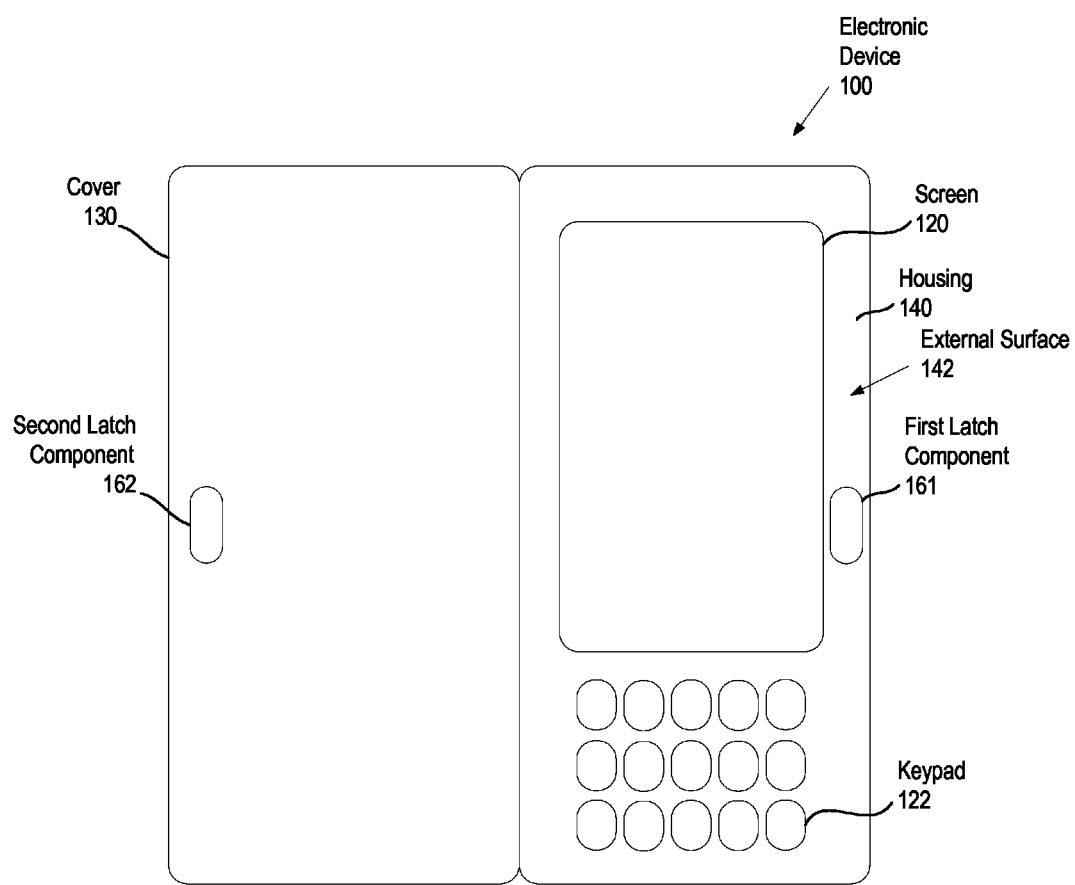
FIG. 1 illustrates a front view of an embodiment of an electronic device.

FIG. 1 illustrates a front view of an embodiment of an electronic device 100. The electronic device 100 may include an electronic book reader, a cellular telephone, a personal digital assistant (PDAs), a portable media player, a tablet computer, a netbook, or any portable, compact electronic device.

The electronic device 100 includes a screen 120 which can display text, images, or other media. In particular, the screen 120 may comprise a liquid crystal display (LCD), an electrophoretic ink (E ink) screen, an interferometric modulator (IMod) screen, or any other type of display. The screen 120 may include a plurality of pixels arranged in a grid having parameters that are individually configurable by the electronic device. For example, the electronic device 100 may be configured to configure the color and/or brightness of individual pixels so as to display an image, text, or other media.

The electronic device 100 includes a housing 140 which partially surrounds and protects the internal components of the electronic device 100, such as those described below with respect to FIG. 13. The housing 140 includes a front surface having openings through which output devices, such as the screen 120 can transmit information to a user and through which input devices, such as the keypad 122, can receive information from a user. In one embodiment, the housing 140 is composed of plastic. In other embodiments, the housing is composed of other materials.

Embedded in the housing 140, beneath an external surface 142 of the housing 140, is a first latch component 161. The external surface 142 may be the front surface through which the screen 120 and 122 are accessed. In another embodiment, the external surface 142 is a side surface or any other surface of the housing 140. The first latch component 161 is configured to engage with a second latch component 162 embedded in a cover 130. The cover 130 may advantageously prevent damage to the screen 120 and prevent accidental key presses on the keypad 122. When the cover 130 is brought in front of the electronic device 100 so as to cover the screen 120 and the keypad 122, the first latch component 161 and the second latch component 162 align and engage. The engagement of the first latch component 161 and the second latch component 162 affixes the cover 130 to the electronic device 100. The affixation of the cover 130 to the electronic device 100 is not necessarily permanent and that the first latch component 161 and second latch component 162 may be disengaged and the cover 130 removed.

Figure 2:
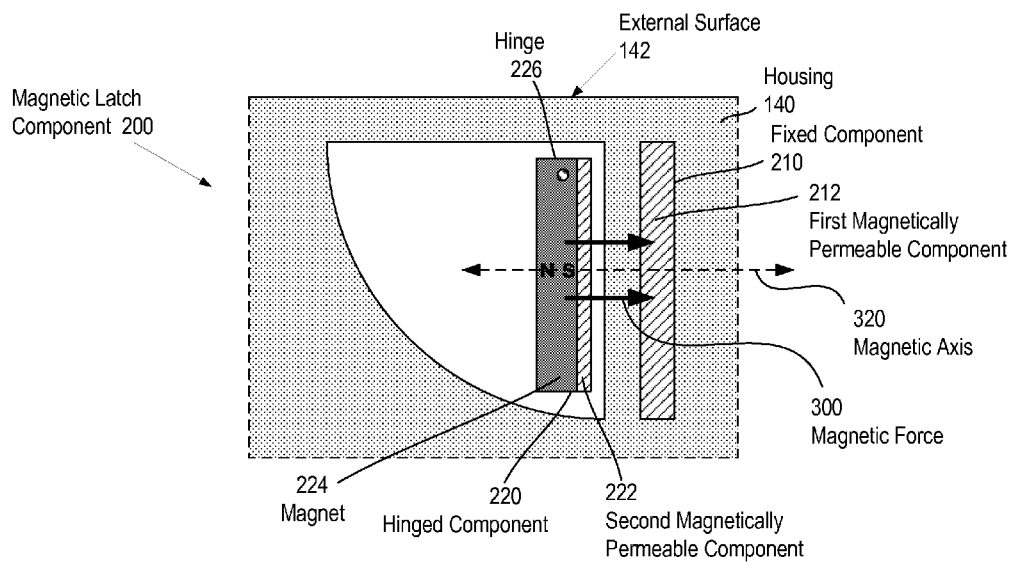
FIG. 2 illustrates a cross-sectional side view of a magnetic latch component in an unengaged position.

FIG. 2 illustrates a cross-sectional side view of a magnetic latch component 200 in an unengaged position. The magnetic latch component 200 is embedded within a housing 140 beneath an external surface 142. The magnetic latch component 200 includes a fixed component 210 and a hinged component 220 spaced apart from and configured to rotate with respect to the fixed component 210. The fixed component 210 includes a first magnetically permeable component 212. The first magnetically permeable component 212 may be composed of steel or another magnetically permeable material. A magnetically permeable material is a material that is influenced by a magnetic field, e.g., a material that is attracted to a magnet. Examples of magnetically permeable materials include iron, nickel, steel and ferrite. In particular, a magnetically permeable material may have a measurable magnetic permeability greater than $1.0 \times 10^{-5}$ henries per meter (H/m).

The hinged component 220 includes a magnet 224 and a hinge 226. The hinge 226 couples the magnet 224 to the housing 140 and allows the hinged component 220 to rotate with respect to the housing 140. In one embodiment, the hinged component 220 includes a second magnetically permeable component 222 upon which the magnet is disposed. The second magnetically permeable component 222 may be composed of steel or another magnetically permeable material.

The magnet 224 includes a north pole and a south pole that define a magnetic axis 320. Although the magnet 224 is illustrated in a particular orientation in the figures, it is to be appreciated that the orientation of the poles could be reversed. In the unengaged position illustrated in FIG. 2, the magnetic axis 320 is substantially parallel to the external surface 142 of the housing 140. The magnetic axis 320 is, generally, directed away from the external surface 142. Thus, the bulk of magnetic flux generated by the magnet 224 does not escape the device to influence external objects.

In the unengaged position illustrated in FIG. 2, the magnetic latch component 200 is stable as the magnet 224 is attracted to the first magnetically permeable component 212 generating a magnetic force 300 that maintains the magnetic latch component 200 in the unengaged position. As will be further described below with respect to FIGS. 3-7, when an active magnetic material, such as another magnet, is introduced to the external surface 142, the hinged component 220 rotates about the hinge 226 to engage the magnetic latch component 200 and, when the active magnetic material is removed, the hinged component 220 rotates back into the unengaged position.

Figure 3:
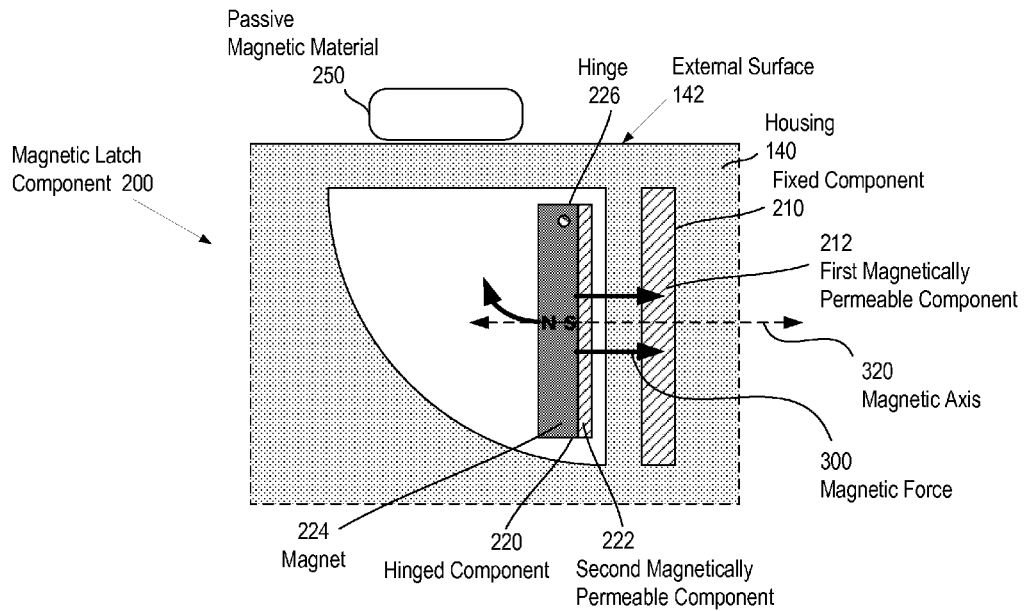
FIG. 3 illustrates a cross-sectional side view of the magnetic latch component in an unengaged position with a proximal passive magnetic material.

FIG. 3 illustrates a cross-sectional side view of the magnetic latch component 200 in an unengaged position with a proximal passive magnetic material 250. The passive magnetic material 250 may include any material that exhibits ferromagnetism but does not produce its own magnetic field. The passive magnetic material 250 may include iron, cobalt, nickel, or alloys thereof. The passive magnetic material 250 may include other materials.

When the passive magnetic material 250 is introduced at the external surface 142, the magnet 224 is attracted to the passive magnetic material 250. However, the attraction is weaker than the attraction between the magnet 224 and the first magnetically permeable component 212. Thus, the introduction of the passive magnetic material 250 does not engage the magnetic latch component 200 and the magnetic latch component 200 remains in the unengaged position.

Figure 4:
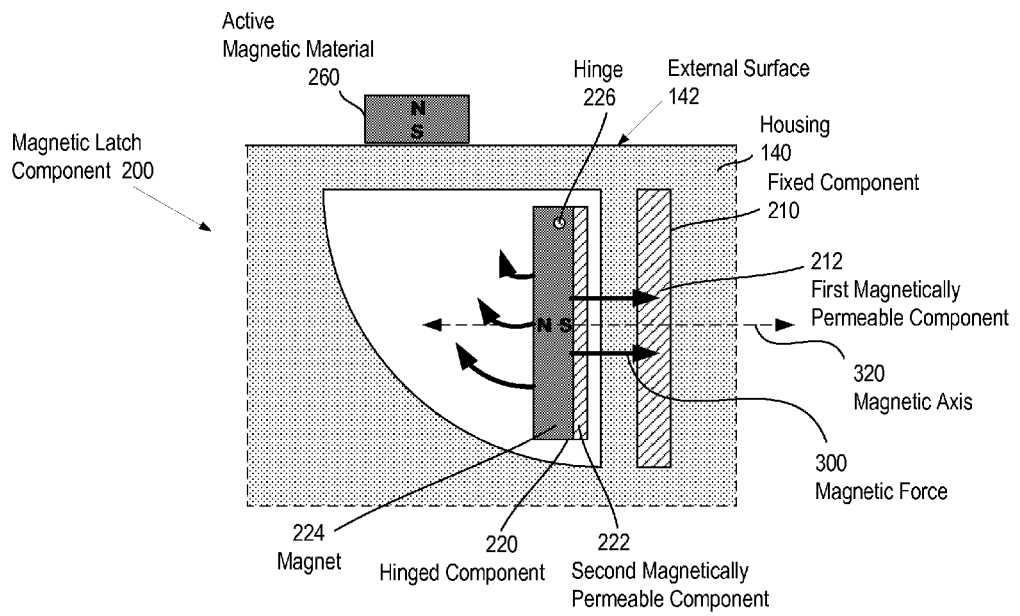
FIG. 4 illustrates a cross-sectional side view of the magnetic latch component in a pre-engaged position with a proximal active magnetic material.

FIG. 4 illustrates a cross-sectional side view of the magnetic latch component 200 in a pre-engaged position with a proximal active magnetic material 260. The active magnetic material 260 may include any material that generates its own magnetic field and produces magnetic flux. The active magnetic material 260 may include a permanent magnet such as a rare earth magnet or an alnico magnet. The active magnetic material 250 may include other materials.

When the active magnetic material 260 is introduced at the external surface 142, the magnet 224 is attracted to the active magnetic material 260. However, unlike the attraction of the magnet 224 to a passive magnetic material 250 as described in FIG. 3, the attraction to the active magnetic material 260 is stronger than the attraction between the magnet 224 and the first magnetically permeable component 212. Thus, the introduction of the active magnetic material 260 provides a rotational force upon a hinged component 220 to rotate the hinged component 220 about the hinge 226 to the engaged position shown in FIG. 5.

Figure 5:
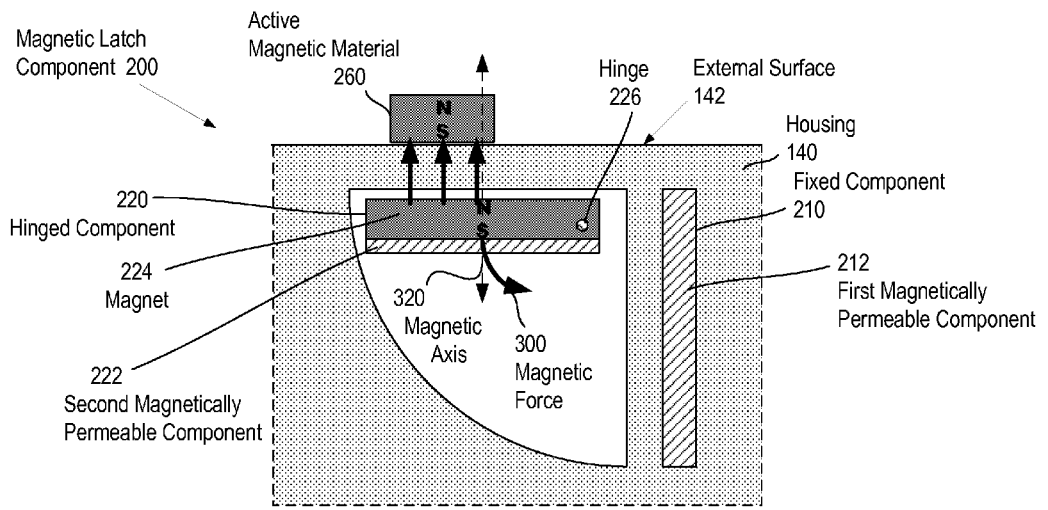
FIG. 5 illustrates a cross-sectional side view of the magnetic latch component in an engaged position.

FIG. 5 illustrates a cross-sectional side view of the magnetic latch component 200 in an engaged position. In the engaged position illustrated in FIG. 5, the magnetic axis 320 is substantially perpendicular to the external surface 142 of the housing 140. The magnetic axis 320 is, generally, directed towards the external surface 142 and towards the active magnetic material 260. In the engaged position, the magnet 224 is weakly attracted to the first magnetically permeable component 212, but much more strongly attracted to the active magnetic material 260.

Figure 6:
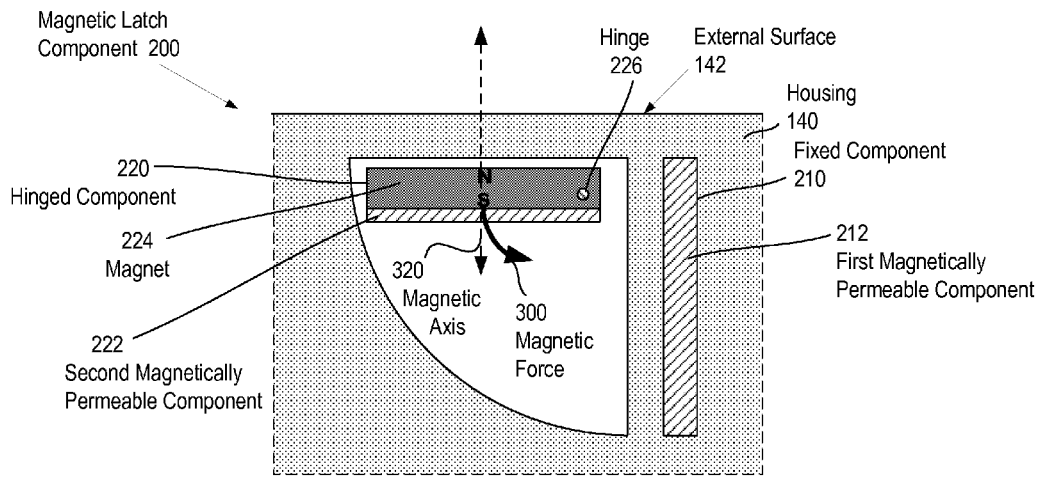
FIG. 6 illustrates a cross-sectional side view of the magnetic latch component in a pre-disengaged position.

FIG. 6 illustrates a cross-sectional side view of the magnetic latch component 200 in a pre-disengaged position. As noted above, the magnet 224 is weakly attracted to the first magnetically permeable component 212 in the engaged position, but this attraction is overpowered by the attraction of the magnet 224 to the active magnetic material 260. When the active magnetic material 260 is removed from the external surface 142, the attraction of the magnet 224 to the first magnetically permeable component 212 become the predominant magnetic force 300 upon the hinged component 220. This attraction provides a rotational force upon a hinged component 220 to rotate the hinged component 220 about the hinge 226 to the disengaged position shown in FIG. 7.

Figure 7:
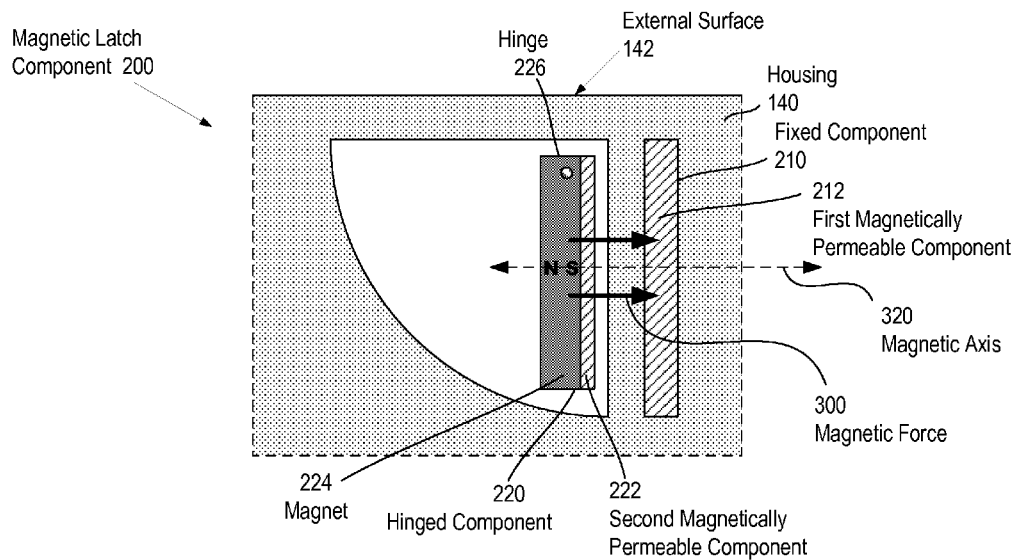
FIG. 7 illustrates a cross-sectional side view of the magnetic latch component in a disengaged position.

FIG. 7 illustrates a cross-sectional side view of the magnetic latch component 200 in a disengaged position. The disengaged position is identical to the unengaged position illustrated in FIG. 2. In particular, the magnetic axis 320 is substantially parallel to the external surface 142 of the housing 140.

Figure 8:
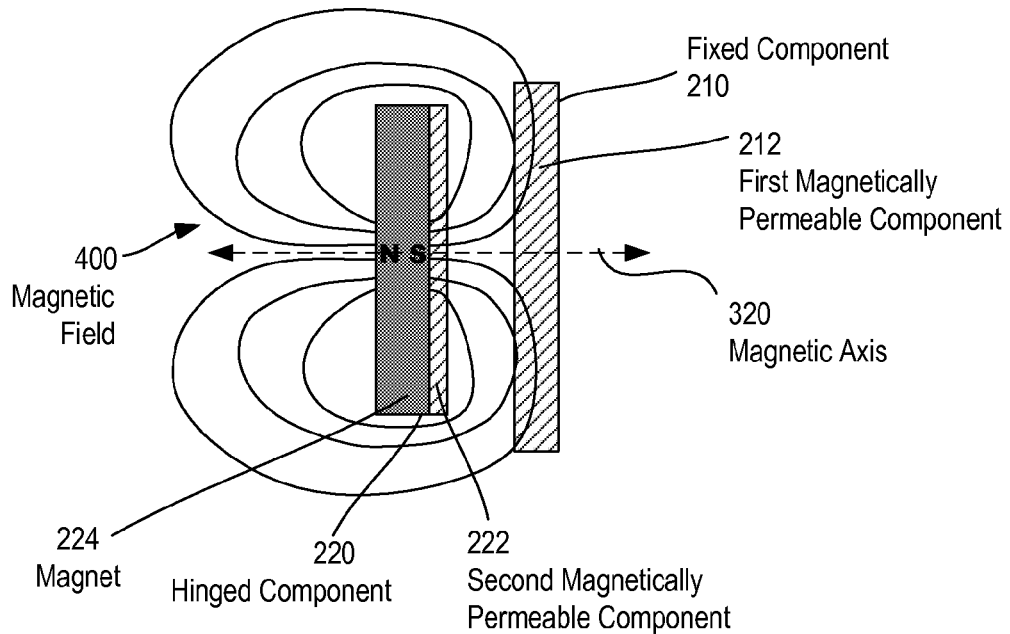
FIG. 8 illustrates a top view of a portion of the magnetic latch component in the unengaged position.

FIG. 8 illustrates a top view of a portion of the magnetic latch component 200 in the unengaged position. For ease of illustration, only the hinged component 220 and the fixed component 210 are shown. FIG. 8 illustrates the magnetic field 400 generated by the magnet 224 as influenced by the first magnetically permeable component 212 and the second magnetically permeable component 222. In particular, as can be seen in FIG. 8, the first and second magnetically permeable components 212 and 222 cause the magnetic flux to extend further on one side of the hinged component 220 than the other. In particular, the magnetic flux on the side of the magnet 224 opposite the fixed component 210 extends further than the magnetic flux on the side of the magnet 224 the fixed component 210 is located.

The size and strength of the magnet 224 and the size and distance between the first and second magnetically permeable components 212 and 222 can be carefully selected. For example, these parameters may be selected so that, as illustrated in FIGS. 2-7, the introduction of a passive magnetic material 250 at the external surface 142 is insufficient to overcome the attraction between the magnet 224 and the first magnetically permeable component 212 and engage the magnetic latch component 200, but introduction of an active magnetic material 260 at the external surface 142 is sufficient to overcome the attraction between the magnet 224 and the first magnetically permeable component 212 and engage the magnetic latch component 200.

Figure 9:
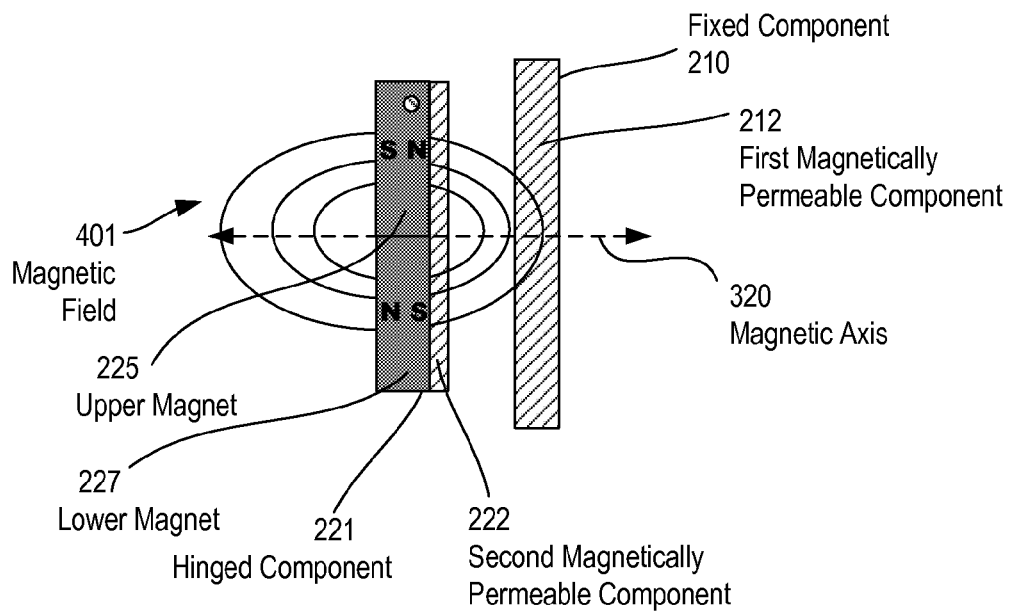
FIG. 9 illustrates a top view of an alternate embodiment of the portion of the magnetic latch component in the unengaged position.

FIG. 9 illustrates a top view of an alternate embodiment of the portion of the magnetic latch component 200. Again, for ease of illustration, only the hinged component 221 and the fixed component 210 are shown. The hinged component 221 of FIG. 9 is substantially similar to the hinged component 220 of FIG. 8, but includes two magnets, an upper magnet 225 and a lower magnet 227. The upper magnet 225 is oriented with its north pole adjacent to the second magnetically permeable component 222 and the lower magnet 227 is oriented with its south pole adjacent to the second magnetically permeable component 222. As mentioned above, although the magnets 225 and 227 are illustrated in a particular orientation in the figures, it is to be appreciated that the orientation of the poles could be reversed.

As in FIG. 8, the magnetic field 401 generated by the upper magnet 225 and lower magnet 227 of FIG. 9 is influenced by the first magnetically permeable component 212 and the second magnetically permeable component 222 which cause the magnetic flux to extend further on one side of the hinged component 220 than the other. However, the magnetic field 401 in FIG. 9 is more focused in that the amount of flux flowing in the direction perpendicular to the magnetic axis 320 is reduced as compared to the amount in FIG. 8.

Figure 10:
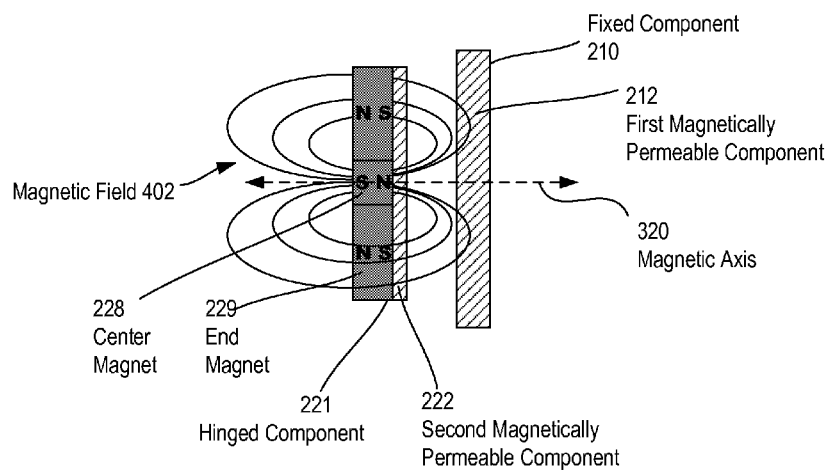
FIG. 10 illustrates a top view of another alternate embodiment of the portion of the magnetic latch component in the unengaged position.

FIG. 10 illustrates a top view of another alternate embodiment of the portion of the magnetic latch component 200. Again, for ease of illustration, only the hinged component 222 and the fixed component 210 are shown. The hinged component 222 of FIG. 10 is substantially similar to the hinged component 220 of FIG. 8, but includes three magnets, a center magnet 228 surrounded by two end magnets 229. The end magnets 229 are oriented with their south pole adjacent to the second magnetically permeable component 222, but the center magnet 228 is oriented with its north pole adjacent to the second magnetically permeable component 222. As mentioned above, although the magnets 228 and 229 are illustrated in a particular orientation in the figures, it is to be appreciated that the orientation of the poles could be reversed.

As in FIG. 8, the magnetic field 402 generated by the center magnet 228 and end magnets 229 of FIG. 10 is influenced by the first magnetically permeable component 212 and the second magnetically permeable component 222 which cause the magnetic flux to extend further on one side of the hinged component 220 than the other. However, the magnetic field 402 in FIG. 10 is more focused in that the amount of flux flowing in the direction perpendicular to the magnetic axis 320 is reduced as compared to the amount in FIG. 8.

Figure 11:
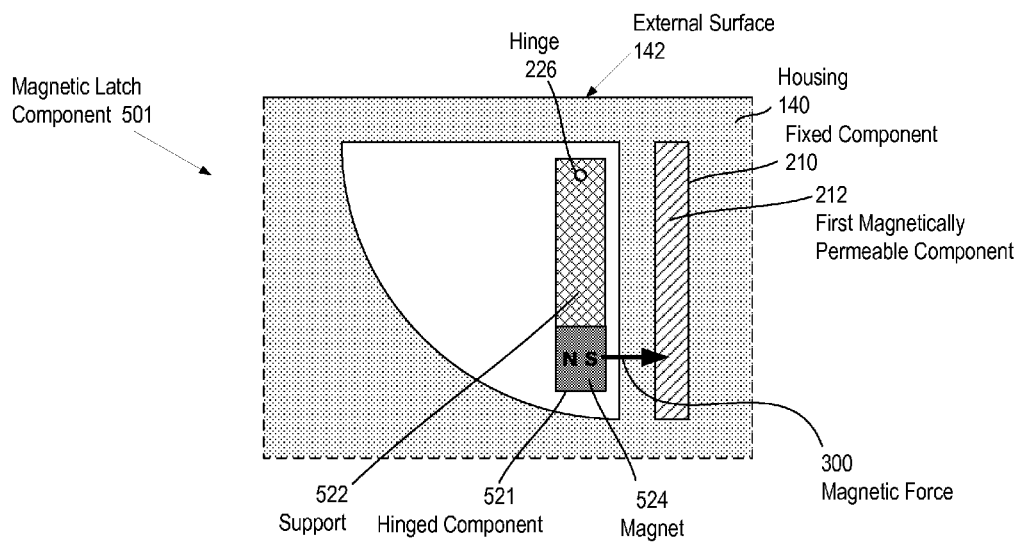
FIG. 11 illustrates a cross-sectional side view of a magnetic latch component with a magnet disposed at an end of a hinged component.

FIG. 11 illustrates a cross-sectional side view of a magnetic latch component 501 with a magnet 524 disposed at an end of a hinged component 521. The magnetic latch component 501 is substantially similar to and operates in a substantially similar manner as the magnetic latch component 200 of FIGS. 2-7, except that the hinged component 521 of FIG. 11 differs from the hinged component 220 of FIGS. 2-7.

The hinged component 521 is spaced apart from and configured to rotate with respect to the fixed component 210. The hinged component 521 includes a hinge 226 and a magnet 524 coupled to the end of a support 522. The hinge 226 couples the support 522 (and the magnet 524) to the housing 140 and allows the hinged component 521 to rotate with respect to the housing 140.

Figure 12:
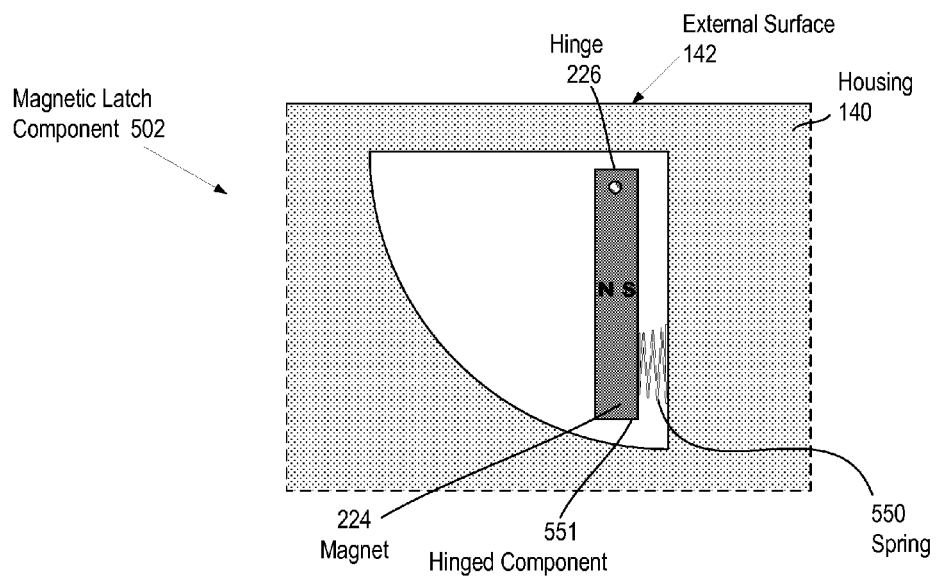
FIG. 12 illustrates a cross-sectional side view of a magnetic latch component with a spring.

FIG. 12 illustrates a cross-sectional side view of a magnetic latch component 502 with a spring 550. The magnetic latch component 502 is substantially similar to and operates in a substantially similar manner as the magnetic latch component 200 of FIGS. 2-7, except that the magnetic latch component 502 includes a spring 550 rather than a first and second magnetically permeable component 212 and 222. The spring 550 provides a force that replaces the force provided by the attraction between the magnet 224 and the first magnetically permeable component 212 in the magnetic latch component 200 of FIGS. 2-7. Although the spring 550 is illustrated as a separate component, in some embodiments, the spring 550 is integrated with the hinge 226.

Figure 13:
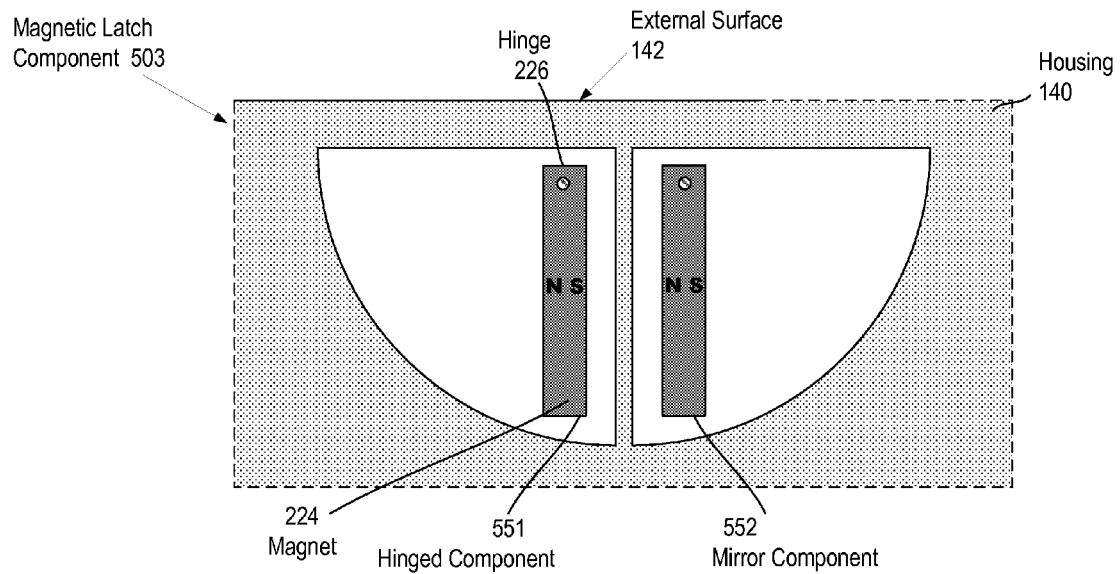
FIG. 13 illustrates a cross-sectional side view of a magnetic latch component with a minor hinged component.

FIG. 13 illustrates a cross-sectional side view of a magnetic latch component 503 with a minor hinged component 552. The magnetic latch component 503 is substantially similar to and operates in a substantially similar manner as the magnetic latch component 200 of FIGS. 2-7, except that the magnetic latch component 502 includes a mirror hinged component 552 rather than a first and second magnetically permeable component 212 and 222. The mirror hinged component 552 includes a magnet having the same orientation as the hinged component 551.

When an active magnetic material is brought proximal to the external surface 142, depending on the size and orientation of the active magnetic material, the hinged component 551, the mirror hinged component 552, or both rotate towards the external surface 142. When the active magnetic material is removed, magnetic attraction between the hinged component 551 and the mirror hinged component 552 provides a force that replaces the force provided by the attraction between the magnet 224 and the first magnetically permeable component 212 in the magnetic latch component 200 of FIGS. 2-7.

Figure 14:
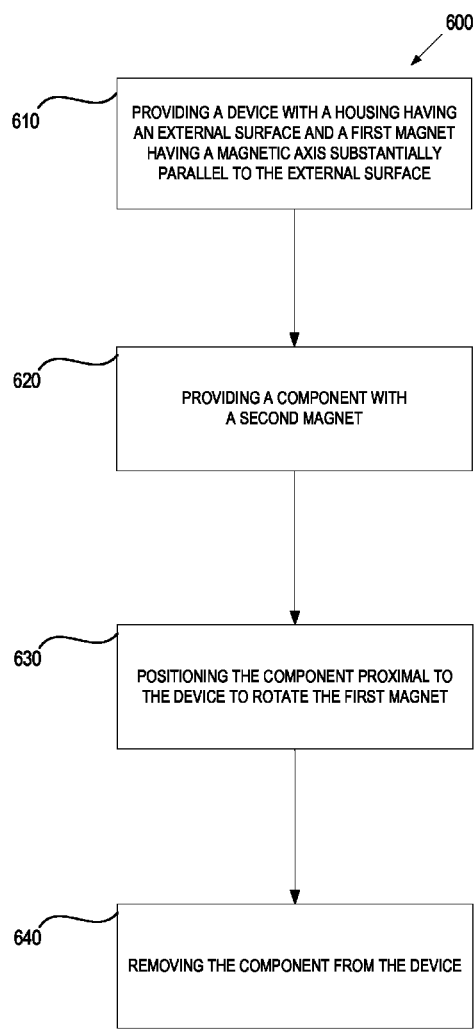
FIG. 14 illustrates a flowchart of a method of aligning a component with a device.

FIG. 14 illustrates a flowchart of a method 600 of aligning a component with a device. The method 600 beings, in block 610, with providing a device. The device includes a housing having an external surface and also includes a first magnet having a magnetic axis substantially parallel to the external surface. The first magnet may include one or more magnets. In block 620, a component is provided. The component includes a second magnet. In one embodiment, the device is an electronic book reader and the component is a cover for the electronic book reader. In another embodiment, the device may be a cellular telephone, a personal digital assistant (PDA), a portable media player, or a tablet computer. The device may be another device not listed above. In another embodiment, the component may be a wireless charging inductor or a near-field communication transceiver. The component may be another component not listed above.

In block 630, the component is positioned proximal to the device. It is to be appreciated that, in some embodiments, the component does not contact, or at least does not directly contact, the device. The positioning rotates the first magnet to have the magnetic axis substantially perpendicular to the external surface. The rotation of the first magnet changes the direction of its magnetic field. In particular, when the second magnet is far from the first magnet, the magnetic flux is directed perpendicular to and not out of the external surface, but when the second magnet is brought close to the first magnet, the first magnet rotates to create a completed magnetic circuit.

The magnetic attraction between the first magnet of the device and the second magnet of component aligns the component with the device. In particular, the magnetic attraction aligns the component with the device without the use of mechanical hardware.

In block 640, the component is removed from the device. When the component is removed from the device, the first magnet rotates to have the magnetic axis substantially parallel to the external surface. In one embodiment, the device includes a fixed component composed of a magnetically permeable material and a magnetic attraction between the first magnet of the device and the fixed component rotates the first magnet. In another embodiment, the device includes a spring that rotates the first magnet when the component is removed.

In one embodiment, providing the device and providing the component may be performed as a single step. For example, both steps may be performed by providing a device including the component. Thus, the steps in both block 610 and 620 may be performed simultaneously. Alternatively, the steps in block 610 and 620 can be performed sequentially or in reverse order.

Figure 15:
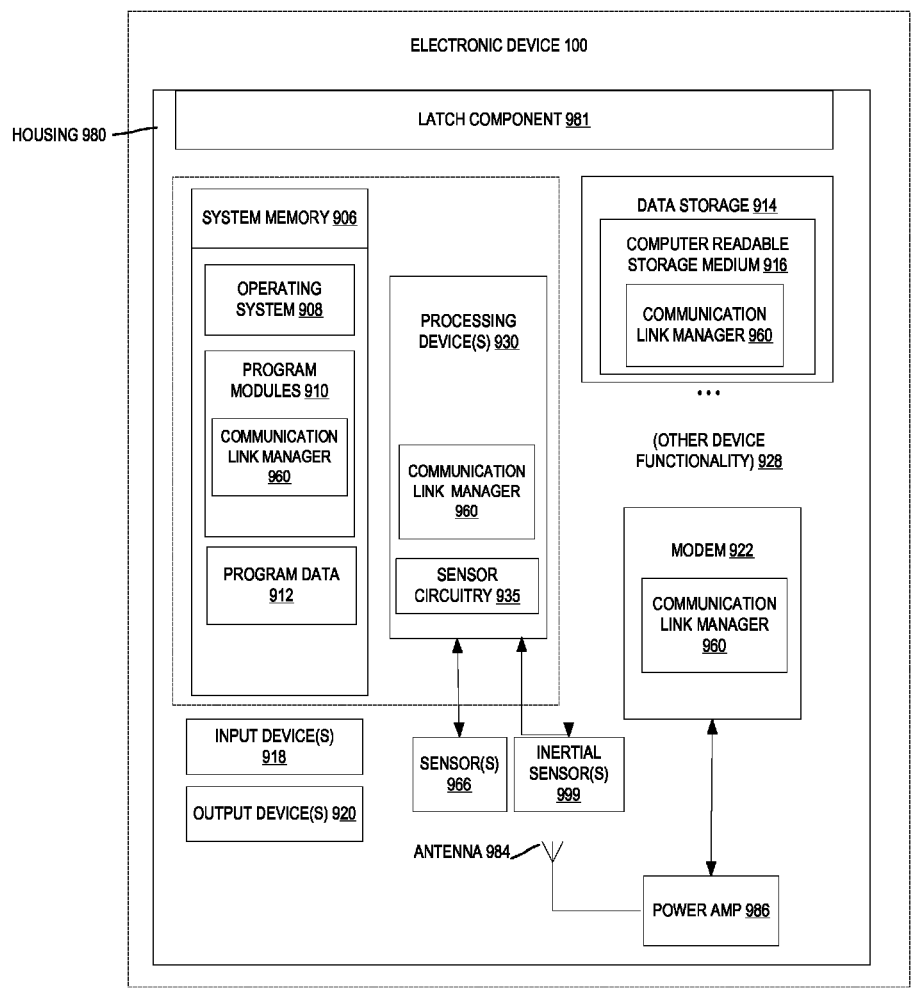
FIG. 15 illustrates a functional block diagram of an embodiment of an electronic device.

FIG. 15 illustrates a functional block diagram of an embodiment of an electronic device. The electronic device 900 may correspond to the electronic device 100 of FIG. 1 and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 900 includes one or more processing devices 930, such as one or more central processing units (CPUs), microcontrollers, field programmable gate arrays, or other types of processing devices. The electronic device 900 also includes system memory 906, which may correspond to any combination of volatile and/or non-volatile storage devices. The system memory 906 may include one or more of read-only memory (ROM), flash memory, dynamic random access memory (DRAM) such as synchronous DRAM (SDRAM)), and static random access memory (SRAM)). The system memory 906 stores information which provides an operating system component 908, various program modules 910 such as communication link manager 960, program data 912, and/or other components. The electronic device 900 performs functions by using the processing device(s) 930 to execute instructions provided by the system memory 906.

The electronic device 900 also includes a data storage device 914 that may be composed of one or more types of removable storage and/or one or more types of non-removable storage. The data storage device 914 includes a computer-readable storage medium 916 on which is stored one or more sets of instructions embodying any one or more of the methodologies or functions described herein. As shown, instructions for the communication link manager 960 may reside, completely or at least partially, within the computer readable storage medium 916, system memory 906 and/or within the processing device(s) 930 during execution thereof by the electronic device 900, the system memory 906 and the processing device(s) 930 also constituting computer-readable media. The electronic device 900 may also include one or more input devices 918 (keyboard, mouse device, specialized selection keys, etc.) and one or more output devices 920 (displays, printers, audio output devices, etc.). In one embodiment, the input devices 918 and the output devices 920 may be combined into a single device (e.g., a touch screen).

The electronic device 900 further includes a wireless modem 922 to allow the electronic device 900 to wirelessly communicate with other computing devices. The wireless modem 922 allows the electronic device 900 to handle both voice and non-voice communications (such as communications for text messages, multimedia messages, media downloads, web browsing, etc.). The wireless modem 922 may also allow the electronic device 900 to handle other signaling data to facilitate communication of the voice and non-voice data between the electronic device 900 and other devices. The wireless modem 922 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1xRTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the communication link manager 960 in addition to, or instead of, the communication link manager 960 being included in the computer readable storage medium 916, system memory 906 and/or processing device(s) 930. The communication link manager 960 may be implemented as hardware, firmware and/or software of the wireless modem 922. It should be noted that the modem 922 may include a processing component that performs various operations to handle both voice and non-voice communications. This processing component can execute the communication link manager 960. Alternatively, the communication link manager 960 can be executed by a processing component of the electronic device, such as the processing device 930.

The wireless modem 922 may generate signals and send these signals to power amplifier (amp) 980 for amplification, after which they are wirelessly transmitted via antenna 984. The antenna 984 may be directional, omni-directional or non-directional antennas. In addition to sending data, the antenna 984 can be deployed to receive data, which is sent to wireless modem 922 and transferred to processing device(s) 930. In one embodiment, the antenna 984 may be used to form communication links between the electronic device 900 and a base station (e.g., a NodeB or a cell tower).

The processing device(s) 930 and the modem 922 may be a general-purpose processing devices such as a microprocessor, central processing unit, or the like. More particularly, the processing device(s) 930 and the modem 922 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 930 and the modem 922 may also be one or more special-purpose processing devices such as an application specific integrated circuit (ASIC), a field programmable gate array (FPGA), a digital signal processor (DSP), network processor, or the like.

In one embodiment, electronic device 900 includes one or more sensors 966 such as a physical contact sensor or close proximity sensors. The sensors 966 can detect the human body parts proximate to the electronic device, and convey information regarding the detection to processing device(s) 930. In one embodiment, the sensors 966 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 966 may also be optical (e.g., infrared) sensors that use an emitter and receiver pair to detect the presence of opaque objects. Alternatively, the sensors 966 may be inductive sensors, which include an inductive loop. When the presence of a human body part (or metal object) is brought close to the inductive sensor, an induction of the inductive loop changes, causing the human body part to be detected. Alternatively, the sensors 966 may be ultrasonic sensors that emit an ultrasonic signal and measure a time duration between when a signal is transmitted and the reflection of that signal received (a.k.a., flight response). The sensors 966 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 966 may be used to determine a distance between one or more of the antennas and the detected human body part. Though the detected object is described herein as a human body part, other types of objects may also be detected depending on the sensing technologies used.

In one embodiment, electronic device 900 includes one or more inertial sensors 999. The inertial sensors 999 can be used to detect motion of the electronic device 900. In one embodiment, the inertial sensors 999 detect linear accelerations (translational movement) and angular accelerations (rotational movement). The inertial sensors 999 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 999 in one embodiment are microelectromechanical systems (MEMS) sensors.

In one embodiment, the motion data from the one or more inertial sensors 399 may be used to determine an orientation of the electronic device 300 to determine if a communication link criterion is satisfied (e.g., whether the electronic device 900 is in proximity to a user's body). In another embodiment, the sensor data from the one or more sensors 966 may be used to determine an orientation of the electronic device 900 for to determine if a communication link criterion is satisfied. In a further embodiment, of the motion data and the sensor data may be used to determine whether a communication link criterion is satisfied.

The processing device(s) 930 may include sensor circuitry 935 (e.g., sensor device drivers) that enables the processing device(s) 930 to interpret signals received from the sensor(s) 966 and/or inertial sensors 999. In one embodiment, the sensors 966 and/or inertial sensors 999 output fully processed signals to the processing device(s) 930. For example, the sensors 966 may output a distance, a detected/not detected signal, etc. using a single line interface or a multi-line interface. Similarly, inertial sensors 999 may output an acceleration value (e.g., in Gs). In another embodiment, the sensors 966 output, for example, positional data and/or object presence data (e.g., of a human body part) to the processing devices) 930 without first processing the data. Similarly, inertial sensors 999 may output, for example, voltage values that can be interpreted as acceleration values. In either instance, the processing device(s) 930 may use the sensor circuitry 935 to process and/or interpret the received data. If data is received from multiple sensors 966 and/or inertial sensors 999, processing the data may include averaging the data, identifying a maximum from the data, or otherwise combining the data from the multiple sensors. In one embodiment, in which the sensors 966 include a sensor array, numerous sensors, or a touch panel, processing the data includes determining where on the electronic device the human body part is located from multiple sensor readings.

The electronic device 100 includes a housing 980 that at least partially surrounds and protects the component of the electronic device 100. Embedded in the housing is latch component 981 configured to latch with a corresponding latch component of a component. The latch component 981 may correspond, for example, to the magnetic latch component 200 of FIGS. 2-7.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A latch system comprising:
   a first latch component comprising a first magnet; and
   a second latch component comprising:
      a first magnetically permeable component; and
      a hinged component disposed apart from the first magnetically permeable component and comprising at least one second magnet disposed on a second magnetically permeable component,
   wherein, when the first latch component is disposed proximal to the second latch component, the first magnet attracts the at least one second magnet to rotate the hinged component from a pre-engaged position with respect to the first latch component, where the hinged component is stabilized in the pre-engaged position by a magnetic attraction between the at least one second magnet and the first magnetically permeable component, to an engaged position with respect to the first latch component to engage the first latch component and the second latch component by magnetic attraction between the first magnet and the at least one second magnet, and wherein the hinged component is configured to move from the engaged position to the pre-engaged position in response to the magnetic attraction between the second magnet and the first magnetically permeable component upon removal of the first latch component.

2. The latch system of claim 1, wherein, when the first latch component is disengaged from the second latch component, the first magnetically permeable component attracts the at least one second magnet to move the hinged component from the engaged position to the pre-engaged position.

3. The latch system of claim 1, wherein the at least one second magnet comprises a middle magnet having a first pole of a first magnetic orientation opposite a second pole of a second magnetic orientation and disposed with the first pole abutting the second magnetically permeable component and further comprises a first end magnet and a second end magnet disposed on opposite sides of the middle magnet, wherein the first end magnet and the second end magnet each have a first pole of the first magnetic orientation opposite a second pole of the second magnetic orientation and are disposed with the second pole abutting the second magnetically permeable component.

4. A device comprising:
   a housing having an external surface; and
   a magnet within the housing, the magnet being movable from a pre-engaged position to an engaged position, where in the pre-engaged position, a magnetic axis of the magnet is substantially parallel to the external surface, and the magnet is stabilized in the pre-engaged position by a magnetic attraction between the magnet and a first magnetically permeable component within the housing, and where in the engaged position, the magnetic axis is substantially perpendicular to the external surface, wherein the magnet is configured to move from the pre-engaged position to the engaged position in response to the introduction of an active magnetic material at the external surface to magnetically engage the magnet with the active magnetic material, and wherein the magnet is configured to move from the engaged position to the pre-engaged position in response to magnetic attraction between the magnet and the first magnetically permeable component upon removal of the active magnetic material from the external surface.

5. The device of claim 4, wherein a strength of the magnet is below an upper threshold to prevent movement of the magnet from the pre-engaged position to the engaged position when a passive magnetic material is introduced at the external surface.

6. The device of claim 5, wherein the strength of the magnet is above a lower threshold to cause movement of the magnet from the pre-engaged position to the engaged position when the active magnetic material is introduced at the external surface.

7. The device of claim 4, further comprising a spring within the housing, wherein, upon removal of the active magnetic material from the external surface, the spring provides a restorative force that causes the magnet to move from the engaged position to the pre-engaged position.

8. The device of claim 4, wherein the magnet is disposed on a second magnetically permeable component.

9. The device of claim 8, wherein the magnet comprises a first magnet having a first pole of a first magnetic orientation opposite a second pole of a second magnetic orientation and disposed with the first pole abutting the second magnetically permeable component.

10. The device of claim 9, wherein the magnet further comprises a second magnet having a first pole of the first magnetic orientation opposite a second pole of the second magnetic orientation and disposed with the second pole abutting the second magnetically permeable component.

11. The device of claim 9, wherein the magnet further comprises a first end magnet and a second end magnet disposed on opposite sides of the first magnet, wherein the first end magnet and the second end magnet each have a first pole of the first magnetic orientation opposite a second pole of the second magnetic orientation and are disposed with the second pole abutting the second magnetically permeable component.

12. The device of claim 4, further comprising a hinge to couple the magnet to the housing, the hinge to allow the magnet to move from the pre-engaged position to the engaged position and from the engaged position to the pre-engaged position.

13. The latch component of claim 1, further comprising a hinge to couple the hinged component to a device housing, the hinge to allow the hinged component to move from the engaged position to the pre-engaged position.

* * * * *